Aug. 2, 1966 — O. H. VARGA — 3,263,961
SEALING MEANS FOR VALVES
Filed Jan. 8, 1964
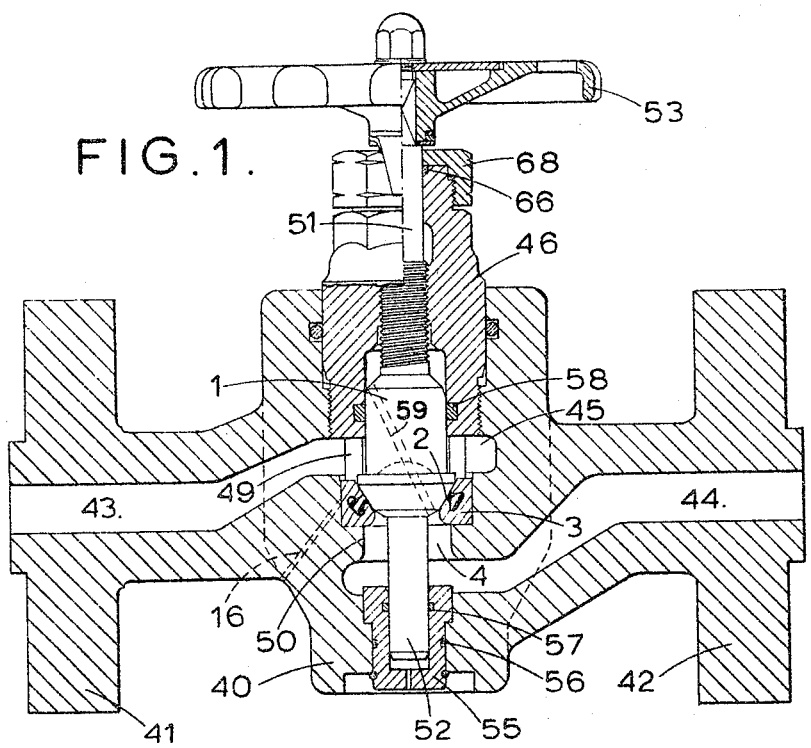
FIG. 1.
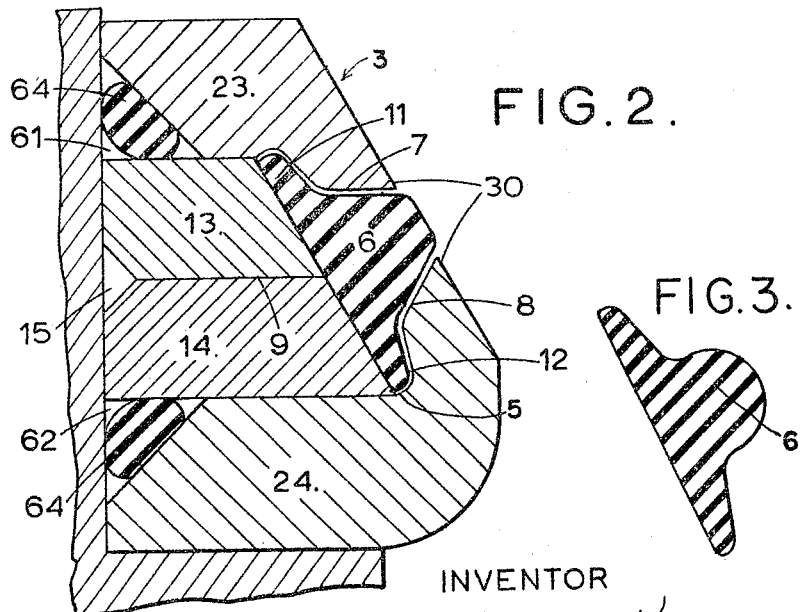
FIG. 2.
FIG. 3.
INVENTOR
Otto Herman Varga
BY Shoemaker and Mattare
ATTORNEYS

United States Patent Office 3,263,961
Patented August 2, 1966

3,263,961
SEALING MEANS FOR VALVES
Otto Herman Varga, Bradford-on-Avon, England, assignor to Seetru Limited, Bristol, England, a British company
Filed Jan. 8, 1964, Ser. No. 336,573
8 Claims. (Cl. 251—332)

This invention is concerned with providing sealing means for effecting positive closure of fluid valves.

In United States Patent No. 3,053,501 there are described sealing means for valves which comprise rings of resilient material having a main body portion of general D-shape in cross-section, and with a continuous peripheral flexible lip. Such rings are intended to be disposed in an annular groove on one of a pair of co-operating valve closure members with the lip of the ring in sealing engagement with the base of the groove, while the body portion is adapted to be in sealing engagement with the second valve closure member, when the valve is closed.

It is a limitation of the rings described in the aforementioned patent that under elevated fluid pressure they will only effectively seal in one direction. It is an object of the present invention to provide a sealing ring of rubber or similar material which is so constituted and arranged as to form an efficient seal between valve closure members under elevated fluid pressures, and which will seal in either direction of flow through the valve.

According to the invention there is provided a resilient sealing ring of rubber or like material and having a main body portion which may conveniently be trapezoidal D-shaped, or trapezoidal in cross section, the ring having a pair of peripherally continuous flexible lips projecting from opposite sides of said main body portion, said lips forming with said body portion a flat side or face of the ring when viewed in cross-section. In use such a ring is disposed in a specially shaped annular groove on one of a pair of co-operating valve closure members. In cross section the groove has a shape which closely follows the contours of the ring and has a flat base against which the flat side of the ring is disposed, and undercut side walls in which the projecting lips of the ring are accommodated. The main body of the ring protrudes a small distance through the open mouth of the groove so that it can effect sealing between the co-operating valve closure members when they are moved in contact with one another to close the valve.

The invention further provides venting means for the underside of the lip and main ring section, and these are preferably placed in the centre of the ring groove base. A very shallow groove may be placed in the centre of the ring groove base, and holes drilled in it to connect with a venting passage. While venting may be carried out to the downstream side of the valve, this is clearly not possible when the ring has to seal in both directions of flow when venting must be taken to atmosphere. This assumes that the valves in accordance with this invention are used for pressure in excess of atmospheric pressure.

Instead of the venting means being constituted by holes, metal-to-metal abutting surfaces may be provided in the region of the base of the groove to constitute in effect an infinite number of leakage paths leading from the base of the groove beneath said sealing ring to atmosphere. The provision of such metal-to-metal abutment surfaces at the base of the grooves obviates the necessity of boring or casting the venting holes and is formed by two metal surfaces. If two such metal surfaces are normally machined, i.e. without super-finishing and are placed together without intervening sealing means, the very small spaces between them will provide a sufficiently large leakage path to drain any fluid which may penetrate between the ring and the base of the groove.

The base of the groove in which the ring is seated may be flat annular, conical, while the surface in which the groove is formed may be any of these shapes or spherical.

It is clear that a groove with a double undercut, as described, cannot readily be machined and it is therefore a constructional feature of the seat according to one embodiment of this invention that it is of built-up construction, i.e. it is composed of a number of cooperating components which are held together on assembly to form a seal pack.

One embodiment of the invention is shown by way of example in the accompanying drawings, in which:

FIG. 1 is a view in cross-section of a typical valve arrangement incorporating the seal pack shown in FIG. 2.

FIGURE 2 is a detail view of a sealing ring in its groove, which latter is constructed from a plurality of components which when assembled together with the sealing ring constitute a seal pack.

FIG. 3 is a view of a modified form of sealing ring, D-shaped in cross-section.

In the drawings, 1 represents a movable valve closure member having a conical surface 2 adapted to be brought into abutment with a conical face of a seal pack generally designated 3 of the valve to obturate passage 4 through which fluid flow may take place in either direction.

As shown in detail in FIGURE 2 this seal pack 3 includes a ring of rubber or like resilient material having a main body portion 6, there being peripherally continuous lips 11 and 12 projecting in opposite direction from said main body section. The lips and part of the main body portion of the ring are shaped to constitute a flat face which is adapted to lie against the base of a groove or recess 5 formed for the purpose in the seal pack 3. The side walls 7 and 8 of the recess 5 are shaped to correspond with the shape of the ring and are undercut to accommodate the lips.

The lands overhanging the undercut portions may be of continuous section or, they may be provided with apertures leading to the faces of the lips 11 and 12 by means of which fluid pressure is brought to bear on the lips 11 and 12 to force them against the base of the groove as will be hereafter described.

As a groove with a double undercut as shown and described is employed, it cannot be readily machined and it is therefore a constructional feature of this invention that the seal pack 3 is constituted by a number of parts including two complementary metal rings 13 and 14 which are shaped to form the base of the groove 5, a metal ring 23 which is shaped to form the side wall 7, and a metal ring 24 which is shaped to form the side wall 8, with the rings 23 and 24 co-operating to form a conical face 30 of the seal pack.

The rings 13 and 14 are also shaped to form an annular groove 15. The abutting surfaces at 9 will be normally machined, that is to say without super-finishing, so that when the surfaces at 9 are placed together, in the absence of sealing means, the very small spaces between them will provide a sufficiently large leakage path from the base of the groove 5 to the annular space 15 surrounding the seat, such space in turn being connected to atmosphere by means of a passage 16 shown in FIGURE 2. By these means any fluid which penetrates beneath the ring will be drained to atmosphere.

It will be appreciated that in the closed position of the valve there is metal-to-metal contact between the conical face 2 and the conical face of the seal pack 3.

When the valve is closed and under pressure the sealing ring 6 is urged towards the groove wall on the downstream side and the crown of the ring is in contact with the conical surface 2. The self-sealing action of the ring 6 will effectively prevent any leak of fluid between the seal pack 3 and the contacting face 2. At the same time the lip 11 or 12 which is on the downstream will come to lie in the groove undercut on the downstream wall 7 or 8 and it is a feature of the design that the lip 11 or 12 as the case may be, will completely fill the undercut part of the groove on the downstream side as otherwise fluid pressure will tend to distort the body of the ring and the lip and may cause the latter to bend or crack. With a properly formed undercut however, the lip is given as much support by the walls of the undercut as is provided for the main body of the ring section by the walls 7 or 8 of the groove. Under these conditions the rubber entirely fills the groove cavities on the downstream side and is thereby able to stand up to and form an effective seal in spite of practically unlimited fluid pressures.

The lip on the upstream side will be out of contact with the groove undercut on that side by an amount of float movement which is deliberately permitted to the ring in the groove and which may amount to between 0.02" and 0.03" for a ring section of 0.21" depth in conjunction with the fact that the lips 11 or 12 are tapered towards their tips. The lip on the upstream side performs an essential sealing action with respect to the base of the ring groove by preventing or inhibiting the penetration of fluid between the ring and the base of the groove.

When pressure is reversed, the ring 6 will move to the opposite side of the groove and the lip sealing action will be taken over by the lip on the opposite side of the main ring section.

The main body section of the ring 6 need not be of trapezoidal in cross section as shown, for a similar sealing effect can be obtained with a ring having a D-shaped main body section.

The valve shown in FIGURE 1 is intended to operate at fluid pressures which may be as high as 6,000 lbs. per square inch and is provided with a housing 40 with end flanges 41 and 42.

Within the housing are fluid passages 43 and 44 (of a diameter of the order of 0.75 inch) the passage 43 leading to a chamber 45 and the passage 44 leading to a passage 4 which is obturated when the valve is closed. 46 is a cover member which is screwed into the body 40. The cover 46 has a number of legs 49 which when the cover 46 is tightened, press down upon the seal pack 3 to secure the latter in position against a shoulder 50.

The valve closure member 1 has a spindle 51 in threaded engagement with the cover 46 and which can be rotated by hand wheel 53 to raise or lower the closure member 1.

55 is a plug which is a push fit in a shaped recess in the housing 40 and serves to locate the lower end of a spigot 52 depending from the closure member 1. 56 is an annular sealing ring of "O" section adapted to prevent leakage between the plug 55 and the housing 40. 57 is an annular ring of rubber having on its inner surface a sleeve of polytetrafluoroethylene.

The rings 23 and 24 of the seal pack 3 are shaped to leave peripheral spaces 61 and 62 in which are located toroidal sealing rings 63 and 64 which prevent leakage of fluid from the passages 43 or 44 to the venting passage 16.

59 is a hole bored through the closure member 1. As fluid will leak up through the bore 59 the pressure at the opposite ends of the valve closure member 1 will be substantially equal so that the valve is fully balanced and operating loads whether the valve is being opened or being closed will be kept to a minimum, an obvious advantage at high fluid pressures.

The upper end of the spindle 52 is provided with a seal 66 which is of similar construction to the seals 57 and 58, while 68 represents a closure unit for retaining the seal 66.

Although the ring 6 is shown housed in a seal pack 3 having a conical seating surface 30, and is adapted to seal against the correspondingly conical surface 2, it will be appreciated that such a ring may be adapted to be housed in a seal pack having its operative closure face of any other convenience shape, for example, spherical, cylindrical or flat annular and that the crown of the ring may be adapted to seal against a correspondingly shaped surface of the valve closure member. In some cases the seal pack with its sealing ring may be arranged on the valve closure member 1 instead of constituting the seat of the valve.

I claim:

1. A valve for controlling the flow of fluid under pressure through a passage comprising a valve closure member and a valve seat member, said members having sealing surfaces, means for moving the sealing surfaces of said members into cooperating abutting relation to close said valve, sealing means carried in one of said sealing surfaces comprising an annular groove in one of said surfaces, said groove having a curved bottom surface which is conical, a resilient sealing ring in said groove, said ring having a main body portion and a base having a curved surface cooperating with said curved bottom surface, said ring having a pair of peripherally continuous flexible lips projecting on opposite sides of said base; the side walls of the groove being spaced from the side surfaces of said body portion and side surfaces of said lips throughout their entire side surfaces when said ring is in an intermediate position, to loosely position said ring in said groove; said lips having curved conical surfaces forming a continuation of the curved surfaces of said base and contacting said curved bottom surface of the groove and in sealing engagement therewith and the opposed side walls of the groove being undercut and receiving said oppositely projecting flexible lips.

2. A valve according to claim 1, wherein drain holes vented to the atmosphere are positioned in the said bottom surface of the groove for draining liquid from between the sealing ring and the bottom surface.

3. A valve according to claim 1, wherein the bottom surface of said groove is formed by the peripheral surface of two face contacting metal rings, and the opposed side walls of said groove is formed by two additional metal rings.

4. A valve according to claim 3, wherein the metal rings and the sealing ring constitute a seal pack forming a valve seat, and said movable valve closure cooperating with said valve seat to seal the closure.

5. A valve according to claim 4, wherein the contacting faces of said two metal rings are uneven providing leakage paths through said pack.

6. A sealing ring according to claim 1, wherein the main body portion of the ring is substantially trapezoidal in cross-section.

7. A sealing ring according to claim 1, wherein the main body portion of the ring is substantially D-shaped in cross-section.

8. A sealing ring according to claim 1, wherein said lips are tapered from their roots.

References Cited by the Examiner

UNITED STATES PATENTS

| | | | |
|---|---|---|---|
| 1,705,800 | 3/1929 | Akeyson | 251—357 X |
| 2,350,905 | 6/1944 | Koehler | 251—364 X |
| 2,525,799 | 10/1950 | Hecker | 251—361 X |
| 2,810,543 | 10/1957 | Bryant | 251—328 X |
| 2,870,987 | 1/1959 | Greenwood | 251—328 X |
| 2,933,285 | 4/1960 | Tucker | 251—357 X |
| 3,050,077 | 8/1962 | Wheatley | 251—328 X |
| 3,076,631 | 2/1963 | Grove | 251—328 X |
| 3,085,783 | 4/1963 | Pulling | 251—332 X |

M. CARY NELSON, *Primary Examiner.*

A. ROSENTHAL, *Assistant Examiner.*